United States Patent
Rijsdijk et al.

[19]

[11] Patent Number: 5,952,071
[45] Date of Patent: Sep. 14, 1999

[54] CURABLE ADHESIVE SYSTEM

[75] Inventors: Henk Rijsdijk, Netherlands; Noel Overbergh, Rotselaar; Gerry De Blick, Tielt-Winge, all of Belgium; Graham Miles; Aine Kennan, both of Swindon, United Kingdom

[73] Assignee: N.V. Raychem S.A., Kessel-lo, Belgium

[21] Appl. No.: 08/714,102

[22] PCT Filed: Mar. 30, 1995

[86] PCT No.: PCT/GB95/00731

§ 371 Date: Jan. 9, 1997

§ 102(e) Date: Jan. 9, 1997

[87] PCT Pub. No.: WO95/27764

PCT Pub. Date: Oct. 19, 1995

[30] Foreign Application Priority Data

Apr. 12, 1994 [GB] United Kingdom .................. 9407182

[51] Int. Cl.⁶ .................................................. B32B 3/00
[52] U.S. Cl. ...................... 428/58; 428/304.4; 428/317.3; 428/317.7; 428/347; 428/349; 428/355 R; 428/355 EP; 428/413; 428/474.4; 427/516; 525/423; 525/432; 525/425
[58] Field of Search .................... 525/423, 432, 525/425; 428/474.4, 58, 304.4, 317.3, 317.7, 347, 349, 355 EP, 355 R, 413; 427/516, 58

[56] References Cited

U.S. PATENT DOCUMENTS

| | | | |
|---|---|---|---|
| 2,027,962 | 1/1936 | Currie | 18/55 |
| 3,086,242 | 4/1963 | Cook et al. | 18/1 |
| 3,597,372 | 8/1971 | Cook | 260/4 |
| 4,070,225 | 1/1978 | Batdorf | 156/330 |
| 4,409,373 | 10/1983 | Wiemers et al. | 525/432 |
| 4,447,579 | 5/1984 | Takagi et al. | 525/113 |
| 4,457,800 | 7/1984 | Schure et al. | 156/307.3 |
| 4,707,388 | 11/1987 | Park et al. | 428/36 |
| 4,844,959 | 7/1989 | Read et al. | 428/34.9 |
| 4,956,423 | 9/1990 | Lee | 525/432 |
| 4,972,042 | 11/1990 | Seabourne et al. | 174/23 R |
| 5,296,557 | 3/1994 | Frihart | 525/423 |
| 5,298,304 | 3/1994 | Narushima et al. | 428/40 |
| 5,385,986 | 1/1995 | Frihart | 525/420.5 |

FOREIGN PATENT DOCUMENTS

| | | | |
|---|---|---|---|
| 0 074 218 | 3/1983 | European Pat. Off. | C09J 7/02 |
| 0 117 737 | 9/1984 | European Pat. Off. | B29C 25/00 |
| 0 193 068 | 9/1986 | European Pat. Off. | C08G 59/18 |
| 0 223 044 | 5/1987 | European Pat. Off. | C09J 3/16 |
| 0 223 045 | 5/1987 | European Pat. Off. | C09J 3/16 |
| 0 441 545 | 8/1991 | European Pat. Off. | C08L 77/00 |
| 0 442 700 | 8/1991 | European Pat. Off. | C09J 163/00 |
| WO87/07755 | 12/1987 | WIPO . | |
| WO91/05024 | 4/1991 | WIPO | C09J 177/00 |

OTHER PUBLICATIONS

Search Report for British Application No. 9407182.6, filed Apr. 12, 1994.
Search Report for International Application No. PCT/GB95/00731, filed Mar. 30, 1995.

*Primary Examiner*—Randy Gulakowski
*Attorney, Agent, or Firm*—Herbert G. Burkard; Marguerite E. Gerstner

[57] ABSTRACT

Two-component curable adhesive for blocking automotive wiring bundles, the respective components preferably amine-terminated polyamide Part A, and acrylate, anhydride or epoxy Part B, being contained in separate sheets which are inter-leaved with one another. The concentration of the reactive components in the sheets is chosen to cause the adhesive to flow on initial heating and then to cure to resist further flow at elevated temperatures in service. Apparatus, kits and method for blocking cables or wire bundles using the adhesive are also claimed.

16 Claims, 3 Drawing Sheets

CURABLE ADHESIVE SYSTEM

FIELD OF THE INVENTION

This invention relates to a two-part curable adhesive system, and especially to such systems which may be very suitable for blocking electrical cables and harnesses to prevent penetration of fluids between the wires of the cable or harness.

INTRODUCTION TO THE INVENTION

Known blocking adhesives tend to suffer from problems such as inability to penetrate adequately into the cable wire bundle, or excessive flow along the wire bundle, or inability to maintain adequate cable blocking action when the blocked cable is tested after exposure to temperatures above 110° C., for example 3000 hours at 125° C. and 240 hours at 150° C.

SUMMARY OF THE INVENTION

The adhesive system of the present invention provides room-temperature stability and defines for the first time the "window" of melt flow characteristics and controlled speed and level of reaction in the molten state, which combine to alleviate the problems of the previously known blocking adhesives and tend to produce reliable blocking capable of achieving the aforementioned temperature performance, as hereinafter described.

The invention accordingly provides a two-part curable adhesive system comprising Part A material and Part B material, both of which Parts (A and B) comprise polymeric material and are substantially solid or substantially non-flowable at temperatures up to 60° C. and are substantially unreactive in contact with each other at temperatures up to 40° C., and which Parts (A and B) are capable of flowing and reacting together when heated in contact with each other to temperatures above 80° C., preferably within the range from 80 to 150° C., the materials of Part A and Part B being selected and proportioned so that each of the Parts A and B individually has a Brookfield viscosity less than 200 Pa.s at 80° C., and preferably less than 50 Pa.s at 100° C., and preferably less than 20 Pa.s at 120° C., and preferably being selected and proportioned so that the viscosity of either Part is not more than 2 times (preferably not more than 1.5 times, more preferably not more than 1.33) times that of the other part at the same temperature within the range from 80 to 150° C.

wherein material (preferably polymeric material) of at least a first type included in Part A carries reactive groups of at least a first kind, and wherein Part B is substantially free from reactive groups of the kind or kinds contained in Part A, and Part B includes material (preferably polymeric material) of the said first type and/or of a second type (preferably substantially completely compatible with the said first type), and wherein material (preferably polymeric or oligomeric material) included in Part B carries reactive groups of at least a second kind capable of reacting with the said reactive groups contained in Part A when the Parts A and B are heated together as aforesaid, and wherein the proportion of the said reactive groups in Part A and/or in Part B respectively (a) is at least $45 \times 10^{-5}$ moles (preferably at least $60 \times 10^{-5}$ moles, more preferably at least $90 \times 10^{-5}$ moles), of the said reactive groups per gram of total material present in the relevant Part, and (b) is less than $200 \times 10^{-5}$ moles (preferably less than $150 \times 10^{-5}$ moles), of the said reactive groups per gram of total material present in the relevant Part, and wherein the reactivity and proportions of the said reactive groups in Part A and Part B are selected so that, when the Parts are heated to flow and react together, the Brookfield viscosity of the resulting reacting mixture of Part A and Part B (a) remains below 300 Pa.s (i) for at least 3 (preferably 4, more preferably 5) minutes at 80° C., (ii) for at least 2 (preferably 3, more preferably 4) minutes at 100° C., and (iii) for at least 1 (preferably 2, more preferably 2.5) minutes at 150° C.

and (b) rises to at least 1000 Pa.s (i) within 20 (preferably 10, more preferably 7.5) minutes at 80° C., (ii) within 6 (preferably 4) minutes at 100° C., and (iii) within 3.5 (preferably 2) minutes at 150° C.

DETAILED DESCRIPTION OF THE INVENTION

It is comparatively easy to select materials for making Part A and Part B of the system which are substantially solid or at least substantially non-flowable, at temperatures up to 60° C. The materials are also selected so that Part A and Part B are substantially unreactive when placed in contact with each other at temperatures up to 40° C.

The materials must also be selected, as a first constraint for cable blocking purposes, so that Part A and Part B are capable of flowing and reacting together when heated in contact with each other to temperatures above 80° C., preferably within the range from 80 to 150° C. Preferably, the Parts A and B will be capable of thus flowing and reacting at temperatures of 80 to 120° C., more preferably 80 to 100° C., and in some cases especially at 80° C., since these lower temperatures are more likely to be encountered by the adhesive system when used with a heat-shrinkable covering as hereinafter described. In many cases, it may be especially preferred that Part A and Part B individually have a low Brookfield melt viscosity, for example less than 200 Pa.s at 80° C., and preferably less than 50 Pa.s at 100° C., and preferably less than 20 Pa.s at 120° C. (Most commercially used hot melt adhesives tend to have viscosities of the order of 40–80 Pa.s at 160° C.). Preferably, the majority by weight of the polymeric material in Part A and/or in Part B has a flow temperature within the range from 65 to 80° C.

As a second preferred constraint identified by the present invention, the viscosity of either Part A or Part B will not be more than 2 times (preferably not more than 1.5 times, more preferably not more than 1.33 times) that of the other Part at the same temperature within the range from 80 to 150° C. Such approximate matching (the closer the better) of the viscosities enhances the mixing and reaction of Part A with Part B, especially at the relatively low temperatures and relatively short heating and mixing times encountered under the aforementioned heat-shrinkable articles.

A third constraint according to the present invention requires that material (preferably polymeric material) of at least a first type (e.g. polyamide or ethylene/vinyl acetate copolymer or ethylene acrylate co- or ter-polymer) included in Part A carries reactive groups of at least a first type (e.g. amine groups, hydroxyl groups); that Part B is substantially free from reactive groups of the kind or kinds contained in Part A; and that material (preferably polymeric material) included in Part B of the said first type and/or of a second type (e.g. ester, epoxy, polybutadienes or urethane oligomers) (preferably substantially completely compatible with the said first type) carries reactive groups of at least a second kind (e.g. epoxy, anhydride, cyano or acrylate groups) capable of reacting with the said reactive groups in Part A when the Parts A and B are heated in contact with each other to temperatures within the range from 80 to 150° C. as aforesaid.

A fourth constraint identified by the present invention which tends to enhance blocking performance requires a relatively low level of the reactive groups in one or both of the Parts A and B, so that a controlled level of reaction is obtained, below that at which the reacted system would be unacceptably brittle or otherwise unsuitable. The proportion of the said reactive groups in Part A, or in Part B, or preferably in Part A and Part B respectively, is therefore selected or adjusted (a) to be at least $45 \times 10^{-5}$ moles (preferably at least $60 \times 10^{-5}$ moles, more preferably at least $90 \times 10^{-5}$ moles), of the said reactive groups per gram of total material (preferably of total polymeric material) present in the relevant part; and (b) to be less than $200 \times 10^{-5}$ moles (preferably less than $150 \times 10^{-5}$ moles), of the said reactive groups per gram of total material (preferably of total polymeric material) present in the relevant Part. At these levels, the reaction can be controlled to achieve desirable degrees of temperature resistance (e.g. 150° C. rating) without detracting from the desired initial flow characteristics which tend to produce acceptable levels of blocking.

A fifth constraint indentified by the present invention requires balancing of the reactivity of the reactive groups within the above ranges of proportions in Part A and Part B so that, when the parts are heated to flow and react together, the resulting reacting mixture of Part A and Part B (a) remains low enough in viscosity for long enough to permit the molten mixture to penetrate fully into the interstices to be blocked and to surround, and to make good surface contact with, the wires or other elongate members (e.g. optical fibers) within the cable or harness; and (b) thereafter reacts to a sufficient extent to resist unblocking of the blocked cable or harness when exposed to temperatures up to 150° C., but not to an extent which unacceptably embrittles the reacted composition.

It has been found, according to the present invention, that this fifth constraint can be satisfied by selecting the reactivity and proportions of the reactive groups in Part A and Part B so that the Brookfield viscosity of the aforesaid reacting mixure (a) remains below 300 Pa.s
(i) for at least 3 (preferably at least 4, more preferably at least 5) minutes at 80° C.,
(ii) for at least 2 (preferably at least 3, more preferably at least 4) minutes at 100° C., and
(iii) for at least 1 (preferably at least 2, more preferably at least 2.5) minutes at 150° C., and
(b) rises to at least 1000 Pa.s
(i) within 20 (preferably 10, more preferably within 7.5) minutes at 80° C.,
(ii) within 6 (preferably within 4) minutes at 100° C., and
(iii) within 3.5 (preferably within 2) minutes at 150° C.

It is possible to select by trial and error, using known test methods, materials which meet the aforementioned five constraints defining the "window" of properties which make the present adhesive system especially beneficial for cable blocking. It is believed that any two-part curable adhesive system whose parts are substantially solid and unreactive at temperatures up to 40° C., and which meet the other requirements hereinbefore specified, will achieve superior cable blocking performance.

The reaction between Part A and Part B, at the relatively low levels which achieve the desired high-temperature performance without embrittling the adhesive, may involve any appropriate mechanism, for example polymer chain extension, chain tangling, formation of interpenetrating polymer networks, cross-linking, or gel formation.

When gel formation is involved, it is preferred to limit the reactive proportions so that the weight of gel produced is at least 20%, preferably at least 30%, but preferably no more than 50% of the total weight of the adhesive system. Lower gel contents, for example 10% or 15%, can produce acceptable results, but it is not essential for detectable levels of gel to be formed if other mechanisms are involved.

The benefits of the present invention may preferably be achieved when the aforesaid first type of polymer is polyamide. Polyamides are well known, for example those available under the "Macromelt" trade mark, such as M6747, M6301, M6768, M6743 or "Unirez" (Trade Mark) 2654. Mixtures of polyamides may be used.

Preferably, Part A of the system according to the invention comprises at least 50%, preferably at least 70%, by weight of a first amine-terminated polyamide, or mixture of such polyamides, having an amine value less than 60, preferably less than 50. Such low-amine-value polyamides may be used as the sole polymeric component of Part A. Amine values within the range from 20 to 50 (35 to 88 moles per gram), especially 30 to 40 (52 to 70 moles per gram), are preferred, for example having an amine value of 33. This kind of polyamide is especially preferred when it has a desirably low flow temperature of 74° C. and a Brookfield melt viscosity of only 25 Pa.s at 100° C.

In many cases, however, it is preferable to blend the majority low-reactivity polymer, such as the preferred polyamide just described, with a smaller amount (e.g. at least 5%, preferably at least 10%, by weight of Part A) of a much more highly reactive polymer of the same polymer type, for example a second amine-terminated polyamide having an amine value greater than 100, preferably greater than 200, more preferably greater than 300. An example of such a high-reactivity polyamide is that available under the trade mark Reamide PGF4 from Henkel which is viscous at room temperature and thus needs the room-temperature-non-flowable majority polymer to render the blend storage stable.

The use of a room-temperature-viscous minority polymer of the same or a different type is also convenient for adjusting the flow temperature of the Part A blend in cases where the majority polymer has a higher-than-desired flow temperature. It may be desirable that a majority by weight of the polymer of Part A and/or Part B is not flowable at temperatures below 80° C., preferably not below 90° C., and at least 5% of the polymeric material in Part A and/or in Part B is flowable at temperatures of not more than 40° C., and the proportion of the flowable polymeric material is selected to reduce the flow temperature of Part A and/or Part B to less than 90° C., preferably less than 80° C., while preferably maintaining the flow temperature(s) above 60° C. Preferably, the flowable (at not more than 40° C.) polymeric material in Part A and/or in Part B carries a majority of the said reactive groups in the relevant Part.

Alternatively, the more highly reactive minority polymer could be of another type, preferably substantially completely compatible with the said first type. This principle of blending a less reactive majority polymer with a more reactive minority polymer may be practiced with types of polymer other than the preferred polyamide type referred to herein for convenience of explanation. The blending of polymers of a single type, for example the preferred polyamide type, is believed to help in promoting formation of a coherent cured body on reaction of Part A with Part B, thus enhancing the high-temperature blocking performance of the adhesive.

When a highly-reactive minority polymer is used as described above, the majority polymer may be less reactive than when it is used alone. For example the aforementioned first amine-terminated polyamide could have an amine value less than 20, and perhaps as low as, or almost as low as, zero, although a value of greater than 5 is thought desirable. An example of such a polyamide would be one of amine value 7–8.

The proportion and kind of reactive groups on the less-reactive majority polymer are preferably selected to ensure some degree of chain tangling or cross-linking or other reaction to enhance the retention of the majority polymers in the eventual cured body of adhesive.

Part B of the adhesive system according to this invention is, as aforesaid, substantially free from reactive groups of the kind or kinds contained in Part A, and includes reactive groups of at least a second kind capable of reacting with the Part A reactive groups when the Parts A and B are heated together. These Part B reactive groups may be a polymer of the aforesaid first type included in Part B, the use of the same type of polymer in both Parts enhancing their melt compatibility. Alternatively, or in addition, the Part B reactive groups may be carried on material (preferably polymeric material) of a second type, preferably substantially completely compatible with the said first type.

In many cases, it will be preferred for Part B to include at least 50%, preferably at least 70%, by weight of Part B, of a relatively unreactive polymer of the said first kind, for example a third polyamide having an amine value not greater than 3, preferably not greater than 1.5, so as to be substantially free of the reactive amine groups found in Part A. This third polyamide is preferably an acid-terminated polyamide.

In this case, Part B will preferably include material, preferably polymeric or oligomeric material, of the said second type carrying the said second kind of reactive groups, preferably carrying a majority or substantially all of the second kind of reactive groups. This second type of reactive material will preferably constitute from 5 to 30% (more preferably 10 to 25%, or 15 to 20%) by weight of Part B.

The reactive groups in Part B will be selected to react appropriately with the reactive groups in Part A (the Part A groups being substantially absent from Part B). Acrylate, epoxy, anhydride, or cyano groups are preferred in Part B for reaction with the preferred amine groups in Part A. Ester or epoxy polymers, or urethane oligomers, are preferred, although others may be selected from suitably functionalized prepolymers, for example polyethylenes, polybutadienes, EPDM's, polyamide, or polyethylene waxes. The reactive material may be single-sited to produce simple chain extension by adding itself to the Part A reactive groups, or may have two or more reactive sides to produce longer chain extension and/or cross-linking.

It is preferred in some cases that the majority by weight of the polymeric material in Part A and/or Part B is composed of polymer(s) carrying fewer than $60 \times 10^{-5}$ moles of the said reactive groups per gram of the said majority polymer(s). The said majority polymer(s) in Part A preferably carry at least $10 \times 10^{-5}$ (more preferably at least $12 \times 10^{-5}$) moles of the said reactive groups per gram of the Part A majority polymer(s).

In view of the relatively low levels of reactive groups in the present adhesive system, it is usually desirable to arrange Parts A and B so as to achieve as much surface contact with each other as practicable before heating to initiate the curing reaction. This could be achieved by mixing a powder of the Part A material with a separate powder of the Part B material. However, for cable blocking purposes it is preferred to use a tape or sheet format which can be wrapped around and/or threaded through the bundle of wires or fibers to be blocked.

Preferably, a sheet or tape of Part A and a separate sheet or tape of Part B are formed by coating the Parts A and B respectively onto separate release surfaces and solidifiing the coatings, whereafter at least one sheet or tape of Part A and at least one of Part B are placed in face-to-face contact with each other, preferably after removal of at least one of them from the release surface on which it was solidified. A composite curable sheet or tape which is advantageous for cable blocking can thus be formed, preferably having at least two sheets or tapes of Part A in alternating face-to-face contact with a sheet or tape (preferably at least two sheets or tapes) of Part B. The curable composition may be supported by a glass fabric or other suitable support to enhance its strength and handling characteristics during installation in wire bundles or other end uses. Alternatively, either Part A or Part B may be provided in the form of a solid sheet or tape and the other part may be extruded or melt coated onto the solid sheet or tape.

Such a composite layered sheet or tape, formed by interleaving previously solidified layers of Part A and Part B respectively, can be suited especially well to the requirements of cable blocking. In contrast, sheets formed by compressing the aforementioned mixture of two powders would tend to be too brittle for blocking purposes; and sheets formed by partly or wholly melting the mixture of component Parts A and B would tend to react prematurely and thus to reduce the initial flow characteristics desired for subsequent blocking end use. Such compressed or melt-processed sheets may tend to be useful where fast reaction and/or a final high level of cure are more important than the initial high flow.

The adhesive system of this invention may be carried on a surface of a dimensionally heat-recoverable article such that in use the adhesive system can be arranged between the heat-recoverable article and an object about which the article is to be recovered in use, and the adhesive system will be caused to flow and to undergo reaction between Part A and Part B by temperatures to which the adhesive system is subjected during the heat recovery of the article.

The invention includes a method of blocking interstices or voids within a cable, comprising placing the adhesive system according to this invention in contact with the part of the cable to be blocked, the adhesive preferably being in the form of a tape or sheet wrapped around and/or threaded through the said part of the cable, placing an enclosure around the adhesive system and the said part of the cable, and heating to cause the adhesive system to flow into the said interstices or voids and thereafter to react the reactive groups of Part A with the reactive groups of Part B so as to render the adhesive system substantially non-flowable at temperatures up to 150° C.

Preferably, the enclosure comprises a dimensionally heat-recoverable article and the said heating is effected by the application of heat which causes the said article to recover around the part of the cable to be blocked. The part of the cable to be blocked in many cases will be a junction, branch-off, or termination. Blocking at intermediate points along a cable or harness is often required, for example by removing part of a cable or harness sheath, placing the adhesive system around the exposed wires or fibers, and applying a suitable enclosure and heating to melt and react the adhesive. The blocking adhesive may also be applied to a harness of wires or fibers before application of an outer covering such as a heat-shrinkable plastics tube.

The invention also includes a kit of parts for cable or harness blocking, comprising a heat-recoverable article and an adhesive system according to this invention, preferably in the form of a sheet or tape as hereinbefore described.

In many cases the Part A and Part B components will soften and flow or otherwise fuse over a temperature range and the softening characteristics of the components may be observed by thermomechanical analysis (TMA) as described in "Thermal Analysis" by T. Daniels published by Kogan, Page 1973. Accordingly, the fusion temperature or the melting point of the reactive components of the adhesive is defined herein as being the temperature at which the TMA probe has penetrated to 60% of the total thickness of the material, usually referred to as $T_{60}$. The TMA data described herein were obtained using a 6.35 mm diameter flat profile loaded with a 50 gram weight and by increasing the temperature of the material at a rate of 10° C. per minute. Preferably the temperature at which reactive components of the adhesive initially become soft (referred to as $T_i$ on the TMA plot) is not more than 30° C. below and especially not more than 25° C. below the melting point ($T_{60}$) of the components so that the difference between the maximum storage temperature and the minimum curing temperature can be reduced as far as possible.

The level of cure of the adhesive may be measured in a number of ways. For example, it may be measured as an increase in the $T_{60}$ (as defined above) or, more preferably the $T_{80}$ of the adhesive, where $T_{80}$ is defined as the temperature at which the TMA probe has penetrated to 80% of the total thickness of the adhesive. In some cases the composition will cure sufficiently to prevent the probe penetrating it by 80% in which case the total depth of penetration is a better measure of cure. Another measure of the level of cure of the adhesive is its gel content which is measured by weighing a quantity of the adhesive into an extraction thimble, refluxing the adhesive for 5 to 8 hours with a solvent (e.g. 1,2-dichloroethane or tetrahydrofuran), drying the thimble in an oven for 24 hours to evaporate the solvent and, after leaving the dried thimble in the atmosphere for a further 24 hours, reweighing the thimble. The gel content is then defined as the final weight of the adhesive (which is insoluble) expressed as a percentage of the initial weight of the adhesive.

The curable adhesive system may, if desired, consist solely of the reactive components although it may be preferred for it to include one or more other components mixed with the reactive components. For example, Part A may comprise curable resin such as an epoxy resin, preferably one based on bisphenol A or on epoxy novolak resin, and Part B may comprise a curing agent such as an amine, carboxylic acid, phenolic resin or isocyanate curing agent. The curing agent may itself be an extrudable polymer, for example it may be a polyamide having free amino groups or a carboxylated polymer such as an ethylene/acid terpolymer, in which case it need not contain any inert component. If the curing agent is not polymeric, for example an organic peroxide or other free radical initiator, it may be desirable for it to be blended with a polymeric material, e.g. a polyester or a reactive or unreactive polyamide before being formed into the sheet. The Part A curable resin may, instead, comprise a polyamide having free amine groups, in which case the Part B curing agent may comprise a material having free or blocked isocyanate functional groups. e.g. a cresyl-blocked isocyanate.

The polyamides that are most suitable to act as one of the components are those that are conventionally used as hot-melt adhesives. These polyamides are characterized by the fact that their amide linkages are separated by an average of at least fifteen carbon atoms and have amorphous structures in contrast with the more hightly crystalline, fiber forming polyamides such as nylon 6 or nylon 6.6. The polyamides preferably have an amine number of at least 1, preferably at least 5.

Chemical curing accelerators may also be present in the curable system, either blended with one of the reactive components or in separate regions of the sheet, provided that they do not unacceptably increase the rate of cure, thus unacceptably decreasing the flow time of the adhesive. Examples of accelerators include dimethylaminopyridine, tris (dimethylaminomethyl) phenol, tin octoate, imidazole or imidazole derivatives such as salts, substituted imidazoles or metal complexes thereof.

A number of inert components may be incorporated in the compositions as long as they do not adversely affect the formation of the preferred sheets, and preferably do not affect the increase in rate or level of cure of the adhesive composition. Also it is preferred that they do not adversely affect the storage life of the adhesive.

Inert components that may be incorporated in the adhesive composition include plasticisers such as phthalates or rosin esters, thermoplastic or thermo-setting polymers, cured or uncured rubbers, inorganic materials to modify the properties of the uncured or cured adhesive such as reinforcing fillers, reinforcing fibres or microspheres, or tackifiers and the like. The other components, whether organic or inorganic, may be in any appropriate physical form, for example they may be in the form of powder, flake or fibers, and are preferably present in an amount of from 5 to 50 percent by weight based on the total weight of the composition. In a preferred aspect of the invention the adhesive composition contains one or more other components having a softening temperature range (from the initial softening temperature to $T_{60}$) that is greater than that of the reactive components so that the softening temperature range of the adhesive composition as a whole is greater than that of the reactive components, preferably by at least 5° C. This has the advantage that, whilst the adhesive will cure when heated to only a relatively low temperature above the maximum storage temperature, it will possess cohesive and adhesive strength over a significantly greater temperature range. Alternatively, in some cases where the reactive components have a large softening temperature range it may be desirable to reduce the softening temperature range of the adhesive composition by incorporation of the appropriate components, for example tackifier resins such as hydrogenated rosin esters and terpene phenols or waxes.

As examples of other components that may be incorporated in the adhesive compositions subject to satisfactory formation of the preferred sheets, there may be mentioned tacky materials such as pressure sensitive adhesives or mastics, or thermoplastic materials. The other components are preferably such as to help the reactive components to mix together at the recovery temperature of the recoverable articles with which the curable adhesive is preferably used.

The preferred curable sheet or tape may be attached to the heat-recoverable article in a number of ways depending on the type of article and curable sheet. For example, where the article has an open, generally uniform configuration, it may be provided with a layer of tacky material, for example a pressure sensitive adhesive layer, e.g. by spraying or in the form of a tape, and the curable sheet may be applied thereto by application of pressure, pressures in the order of 0.8 MPa (120 p.s.i.) and temperatures of about 15 to 30° C. having been found suitable in practice. However, the adhesive system of this invention is often used as a separate self-supporting sheet or tape for cable blocking purposes.

Specific examples of adhesive systems according to the present invention will now be described by way of illustration, percentages being by weight of the whole formulation for Part A or Part B respectively.

EXAMPLE A1

| Polyamide I (A.N. 7–8) | 74% |
| Reamide PGF4 | 17.5% |
| Foralyn 110 | 7.5% |
| Irganox 1010 | 1.0% |

Brookfield Viscosity 43 Pa.s at 80° C., 12 Pa.s at 100° C.

EXAMPLE A2

| Polyamide II (A.N. 33) | 89% |
| Foralyn 110 | 10% |
| Irganox 1010 | 1% |

Brookfield viscosity 95 Pa.s at 80° C., 21 Pa.s at 100° C.

EXAMPLE A3

| Polyamide II | 79% |
| Reamide PGF4 | 10% |
| Foralyn 110 | 10% |
| Irganox 1010 | 1% |

Brookfield viscosity 55 Pa.s at 80° C., 14 Pa.s at 100° C.

EXAMPLE B1

| Polyamide III | 79% |
| Ebecryl 220 | 15% |
| Ebecryl 3605 | 5% |
| Irganox 1010 | 1% |

Brookfield viscosity 64 Pa.s at 80° C., 16 Pa.s at 100° C.

EXAMPLE B2

| Polyamide III | 79% |
| Ebecryl 220 | 20% |
| Irganox 1010 | 1% |

Brookfield viscosity 60 Pa.s at 80° C., 15 Pa.s at 100° C.

Foralyn 110 (Trade Mark) is a polyterpene tackifier resin from Hercules, which has the unexpected effect of reducing the tack of the Part A formulations.

Irganox 1010 (Trade Mark) is a well known phenolic antioxidant.

Polyamide III is an acid-terminated version of the aforementioned Polyamide I, having an acid number (A.N.) not greater than 3, preferably not greater than 1.5.

Ebecryl 220 (Trade Mark) is a hexafunctional urethane acrylate, available from UCB.

Ebecryl 3605 (Trade Mark) is a partially-acrylated bisphenol A epoxy resin available from UCB.

The ingredients of Part A Examples A1 to A3 and of Part B Examples B1 and B2 respectively were melt blended in a 2-blade mixer and melt coated from a hopper onto a release surface (silicone-treated paper), whereafter the resulting sheets of Part A and Part B material were solidified by cooling on the release surfaces.

Layered sheets comprising alternating layers of Part A and Part B were then prepared by removing the solidified Part A and Part B sheets from their respective release surfaces and laying then successively on top of one another using a known laminator. In the following Examples, eight-layered latently-reactive curable sheets were prepared using four layers of Part A alternating with four layers of Part B in the indicated combinations.

EXAMPLE A1B1

Four layers of Part A according to Example A1 (Polyamide I+PGF4) alternated with four layers of Part B according to Example B1 (E220+E3605).

EXAMPLE A2B2

Four layers of Part A according to Example A2 (Polyamide II, no PGF4) alternated with four layers of Part B according to Example B2 (E220, no E3605).

EXAMPLE A3B2

Four layers of Part A according to Example A3 (Polyamide II+PGF4) alternated with four layers of Part B according to Example B2 (E220, no E3605).

The omission of the more reactive Ebecryl 3605 (E3605) from Part B was found to enhance the storage stability of the layered sheets. The presence of the more reactive polyamide Reamide PGF4 in Part A appeared to dominate the rate of cure of the layered sheet at 80° C., where Examples A1B1 and A3B2 cured faster than Example A2B2. However, at 100° C. and 150° C. the rate of cure appeared to be dominated by the reactivity of the majority polyamide in Part A, with Examples A2B2 and A3B2 curing at much the same rate as each other and considerably faster than Example A1B1.

In connection with the aforementioned uses of the adhesive system according to the present invention, it is necessary to consider techniques and equipment for blocking wire bundles, especially wire bundles that are employed in environments where they, or parts of them, may become exposed to water, as a liquid, a spray or as moisture, or to other fluids.

Wire bundles are often employed in wet environments, for example in automotive applications. The bundle may, for example, extend from the engine compartment where it may be exposed to water, to the interior of the vehicle. Not only may the harness be subject to water, but it will normally be unjacketed, simply having a small winding of tape to hold it together, with the result that any water can easily penetrate the bundle. In such a case, and in many others, it may be necessary to provide the bundle with a water block in order to prevent water or moisture passing along the wire bundle in the interstices between the wire. A number of arrangements have been proposed for forming a water block in such bundles. For example, a system described in International application No. WO87/07755 comprises an array of channels formed from a hot-melt adhesive into which wires of the bundle can be located, and a dimensionally heat-recoverable sleeve which can be located over the array. On heating the assembly the hot-melt adhesive forming the array melts and the sleeve shrinks in order to produce the final assembly. Although this system generally works very well, problems may occur with very large numbers of wires in the bundle, for example where there are more than forty wires. In such a case it may not be possible for the adhesive in the region of the center of the bundle to receive sufficient heat to melt the adhesive fully without heating the outer portions of the bundle so much that damage may occur to the wires. For example, in the case of an automotive harness, the wires may be PVC-insulated wires which are rated a temperature of only 85° C. but the adhesive at the center of the bundle may require being exposed to a temperature of at least 95° C. before melting. Although systems employing other forms of adhesive such as curable adhesives have also been proposed, such systems can suffer from the problem that insufficient adhesive flows to the center of the cable bundle to ensure the blocking of all the interstices in the bundle, thereby allowing paths for transmission of water along the bundle.

According to another aspect of the present invention, there is provided a method of forming a water block in a wire bundle, which comprises:

(i) separating some of the wires in the bundle from others of the wires in the bundle to form at least one space between them;

(ii) inserting a flexible mass of a curable adhesive (preferably the adhesive system of the present invention) into at least one space between the wires formed in step (i);

(iii) positioning a dimensionally heat-recoverable sleeve over the part of the bundle that contains the adhesive; and (iv) heating the sleeve and the adhesive to cause the sleeve to recover and the adhesive to flow into the interstices between the wires and then to cure.

The invention has the advantage that an effective water block may be formed in a wire bundle in a very simple manner and with a relatively short assembly time (for example in the order of fifteen seconds). In contrast, the system described in the application mentioned above requires longer assembly times since the wires must be individually inserted into the hot melt adhesive profile (array).

The method according to this aspect of the invention can be used to form an effective fluid block, in cases where no such block is formed if the mass of adhesive is simply wrapped around the bundle without being inserted. It is believed that this is partly due to the reduction in distance the adhesive has to flow in order to block the bundle, and is partly due to the fact that the separation of the wires in step (i) disrupts the layup of the wires to some extent, thereby creating gaps between individual wires in the bundle through which the fused adhesive may flow. In contrast, with known cable blocking techniques employing heat-shrinkable sleeving, recovery of the sleeve would often compress the wires of the cable bundle and impede flow of adhesive radially inwardly to the center of the bundle. In view of this, it is preferred for the method according to the invention to include the location of a further quantity of adhesive around the periphery of the wire bundle in addition to the mass(es) of adhesive that are inserted into the bundle since the adhesive located within the bundle will often aid flow of the adhesive from the periphery to the center of the bundle. The method according to this aspect of the invention is particularly useful where the harness includes a relatively large number of wires, e.g. 20 or more, and especially 40 to 60 wires although the number of wires may be as high as 100 or even more.

The further quantity of adhesive is preferably in the form of an elongate flexible mass that is wrapped around the wire bundle. The adhesive may be employed in any of a number of forms. For example it may be formulated to have the consistency of dough or clay in order that it can be handled easily and also be conformable to some degree with the cable. Alternatively, the adhesive may be solid or liquid if it is supplied in an appropriate manner, that is to say, if it is flexible. For example the adhesive may be located in one or more flexible bags which will allow the adhesive to flow out when it has been heated. Such bags may, for example, be perforate, for example they may have a number of slits or they may be fusible at a temperature that will be experienced during heating of the adhesive. In one preferred method the adhesive is located in a number of sachets that are concatenated to form a train. The sachets may be formed from a material such as an ethylene/vinyl acetate copolymer that will melt at a relatively low temperature, e.g. in the region of 50 to 80° C., and so will let the adhesive flow out when heated. The flexible mass of curable adhesive and the further quantity of curable adhesive may be formed separately from one another and may, in fact, have different compositions. However, it is preferred for them to be the same, and especially for the mass of curable adhesive to form part of the further quantity of curable adhesive. Thus, for example, the mass of curable adhesive that is inserted into the bundle may comprise the end portion or portions of a long train of sachets of the adhesive that is wrapped around the bundle periphery; or preferably it will comprise part(s) of the layered sheet or tape of the adhesive system hereinbefore described.

The adhesive may include a component such as an epoxy, preferably one based on bisphenol A or an epoxy novolak, and a second component or curing agent which is reactive with the first component to cure the adhesive. Examples of curing agents that may be employed with epoxy resins include amines, carboxylic acids, phenolic resins, anhydrides or isocyanates. As stated above the adhesive may be in solid or liquid form. Where the adhesive is provided in the aforementioned sachets it is preferably particulate, for example having particles of weight average diameter in the range of from 1 to 1000 $\mu$m, especially 10 to 300 $\mu$m. In such a case the curing agent may exist separately from the first component. In this case the curing agent particles may appropriately have a weight average diameter that is substantially the same as that of the first component particles. Alternatively the first component may be provided in the form of a liquid for example if the adhesive is located in sachets of impervious material. In such a case it is preferable for the curing agent to be microencapsulated with an inert microencapsulant that will disappear, for example will fuse, when the adhesive is heated.

Whatever the adhesive, and whatever form it is in, it advantageously becomes relatively fluid for a period of time when it is heated before curing sets in and its properties change to those of the cured adhesive. Preferably, the adhesive has a viscosity that falls during heating to a minimum value that is not more than $2.5 \times 10^4$ and especially not more than $2 \times 10^4$ centipoise, but which is at least $6 \times 10^3$ and especially at least $8 \times 10^3$ centipoise. The upper limit for the viscosity range is normally determined by the ability of the adhesive to flow laterally throughout the wire bundle during heating, adhesives that are significantly more viscous tending to leave one or more axially extending moisture paths where it has flowed insufficiently. The lower limit for the viscosity is determined by the undesired tendency of the adhesive to flow along the wires away from the water blocking area, thereby depleting the water block of adhesive.

The wire bundle, adhesive and heat-recoverable sleeve will normally be heated by means of a hot-air gun for a period in the range of from 1 to 10 minutes in order to fuse the adhesive and recover the sleeve and the assembly will then be left to cool. The maximum amount of heat that may be applied to the assembly is normally determined by the temperature to which the wires forming the bundle can be raised without damage, which is normally in the region of 80 to 160° C. In some instances the adhesive will begin to take on some of its cured properties during the heating stage, but usually this will happen only after heating has stopped and the assembly is allowed to cool down. It is preferred for the adhesive to solidify near or at substantially its melting temperature, since any tendency of the adhesive to supercool will lengthen the period during which the adhesive is liquid and will delay the time at which the bundle may be handled. In the case of wire bundles employed for automotive applications such a delay can be considerably disadvantageous from an economic point of view in view of the speed at which the vehicle components are assembled.

As stated above, the sleeve is dimensionally heat-recoverable. Usually these articles recover, on heating, towards an original shape from which they have previously been deformed but the term "heat-recoverable", as used herein, also includes an article which, on heating, adopts a new configuration, even if it has not been previously deformed. In their most common form, such articles comprise a heat-shrinkable sleeve made from a polymeric material exhibiting the property of elastic or plastic memory as described, for example, in U.S. Pat. Nos. 2,027,962; 3,086, 242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate state.

In the production of heat-recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

Any material to which the property of dimensional recoverability may be imparted may be used to form the sleeve. Preferred materials include low, medium or high density polyethylene, ethylene copolymers, e.g. with alpha olefins such as 1-butene or 1-hexene, or vinyl acetate, polyamides or fluoropolymers, e.g. polytetrafluoroethylene, vinylidine fluoride or ethylene-tetrafluoroethylene copolymer.

BRIEF DESCRIPTION OF THE DRAWINGS

A method according to this aspect of the present invention will now be described by way of example with reference to the accompanying drawings, in which.

DETAILED DESCRIPTION OF THE DRAWINGS

Figure 3:
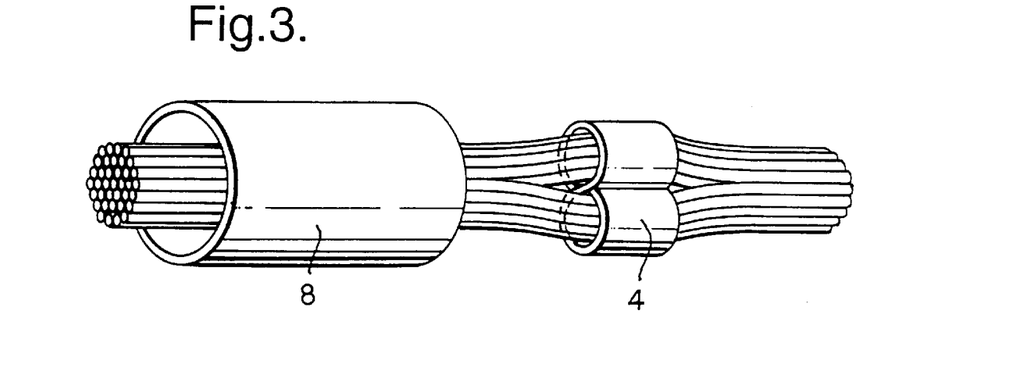
FIG. 3 is a view of the cable bundle later during the method.
Figure 4:
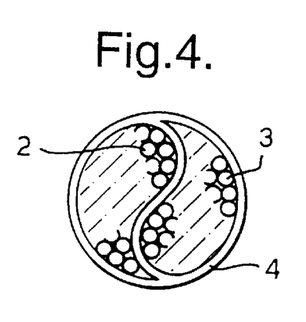
FIGS. 4 to 6 are cross-sections through cable bundles showing the different configurations of adhesive mass that can be used.

Referring to the accompanying drawings, in order to form a water block in an unjacketed bundle 1 of PVC wires, a length (about 7 cm) of dimensionally heat-recoverable tube 8 is first placed over one end of the bundle and slid to a position adjacent to that where the block is intended to be. The bundle 1 is separated manually into two bunches 2 and 3 having a small space between them. A sachet 4, that is formed from an ethylene/vinyl acetate polymer and contains a quantity 5 of a curable epoxy adhesive which contains a microencapsulated hardener, is inserted through the said space between bundles 2 and 3. The sachet may be an individual sachet or may be part of a train 6 of sachets in which case the train of sachets is inserted into the space between the wire bundles until the middle portion of the train is located between the two bundles 2 and 3. Alternatively a single long thin sachet may be employed in place of a train of short sachets. The remaining parts of the train 6 of sachets are then wrapped around the cable bundle in the same direction so that the bulk of the adhesive is located around the periphery of the bundle and a quantity is located in the center of the bundle as shown in FIG. 3. The heat-recoverable tube 8 is then slid over the adhesive sachets and the assembly is heated by means of a hot-air gun so that both ends are recovered initially, whereupon the tube 8 begins to recover and hold the adhesive sachets in place. The adhesive then begins to become more fluid and mixes with the curing agent as the microencapsulant melts, and, as the heating continues the sachets melt thereby allowing the adhesive to flow into the wire bundle (and inevitably, along it to some extent). After 5 minutes the heating is stopped and the assembly is left to cool, whereupon the viscosity of the adhesive increases, partly due to cooling and partly due to curing of the adhesive. In about 15 minutes from termination of the heating operation the assembly can be handled, for example it can be installed in a vehicle, and after about a day the adhesive will substantially have finished curing. The configuration of the mass of adhesive is shown in FIG. 4.

FIGS. 5 and 7 to 9 show a modification of the assembly shown in FIGS. 1 to 4 after the adhesive sachets 6 have been positioned in place and around the wire bundle 1. In this modification the wires of the bundle have been separated into three bunches 2, 3, and 3' and 3" and two sachets 4 and 4' have been inserted between the bunches, one in each space. The method is otherwise as described above with reference to FIGS. 1 and 2, but in this case the curable adhesive 5 has a shorter distance to flow in order to fill the interstices between the wires and block the bundle.

The following Examples illustrate this aspect of the invention:

EXAMPLE 1

Figure 1:
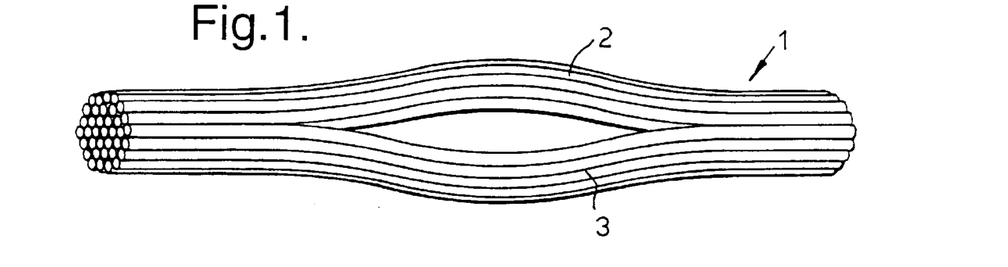
FIG. 1 is a view of part of a cable bundle at one stage during the method.
Figure 2:
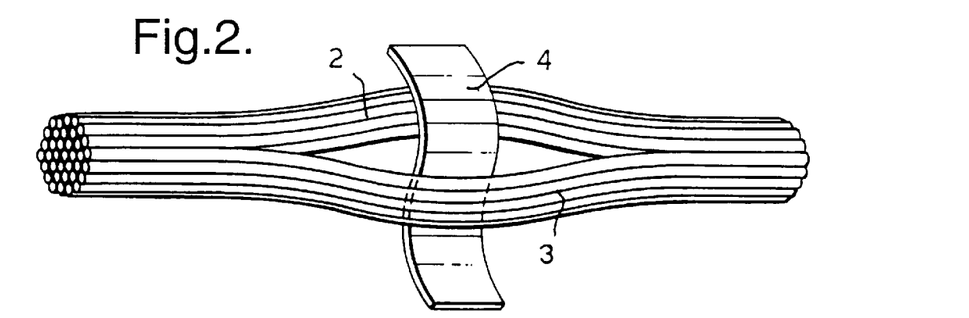
FIG. 2 is a view of the cable bundle and the mass of adhesive during the method.

A bundle containing 57 crosslinked PVC insulated wires was split as shown in FIG. 1 and a single adhesive sachet was inserted and wrapped around the bundle to form the configuration shown in FIG. 4. The adhesive used was a mixture comprising 70% by weight of a microencapsulated epoxy imidazole adduct as described in European Patent Application No. 193068 and sold by Asahi under the designation HX 3722, and 30% by weight of a liquid epoxy sold under the trade name Epikote 1002. The sachet was formed from unperforated ethylene/vinyl acetate copolymer and was 150×25 mm in size, containing 8 grams of adhesive. The sachet could be applied in 15 seconds and, after slipping the heat-shrinkable sleeve over the sachet, the assembly was then heated to melt and cure the adhesive.

In order to test the block, after the bundle had cooled it was attached to a pressurized air line by means of a compression gland, which seals onto the jacket of the block. A soft rubber seal was used to ensure minimum pressure was placed on the block.

The block was then immersed in water with the wire tails extending from the block so that their ends were above the surface of the water. The block was pressurized to 0.5 bar. No air leak (ie. bubbles) emerged from the block (duration 30 seconds) indicating that the block had passed.

EXAMPLE 2

Figure 5:
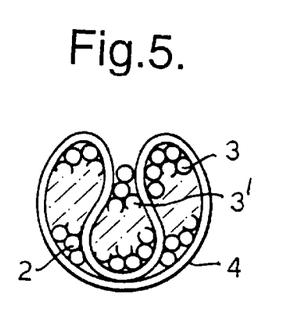

Example 1 was repeated with the exception that the sachet had dimensions of 150×10 mm and contained 6 g adhesive, and that the sachet was wrapped about the bundle using the configuration shown in FIG. 5.

EXAMPLE 3

Figure 6:
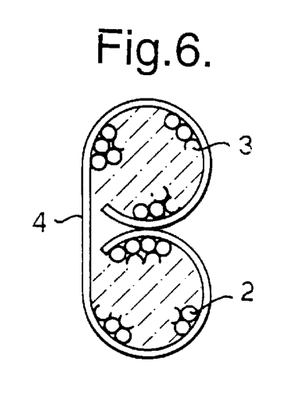
Figure 7:
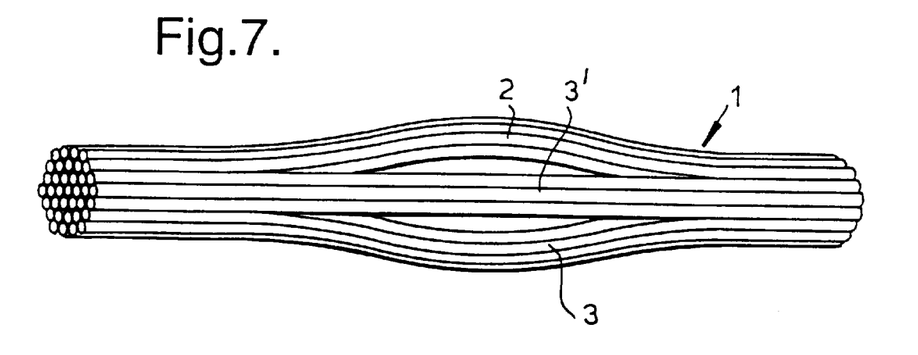
FIGS. 7 to 9 show steps of a method for forming a block as shown in FIG. 5.
Figure 8:
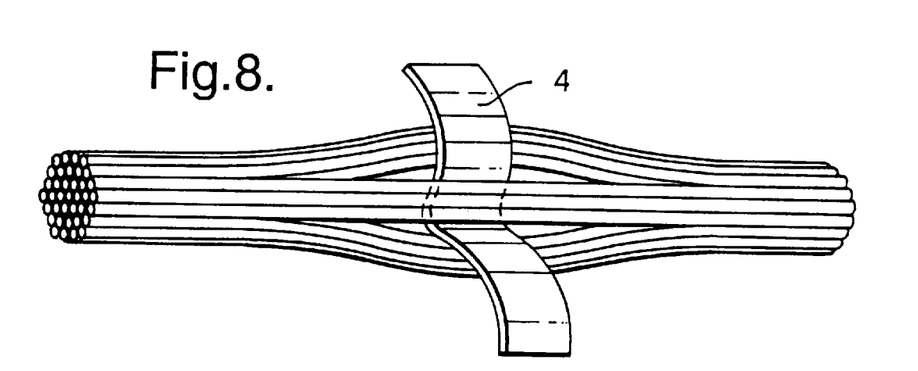
Figure 9:
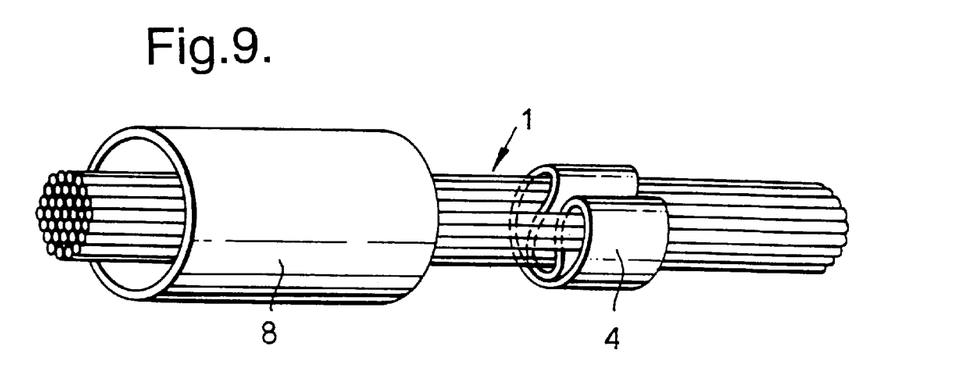

Example 2 was repeated with the exception that the sachet was wrapped using the configuration shown in FIG. 6. The time required to apply the sachet was 30 seconds.

The sachets may be replaced by the layered adhesive tape hereinbefore described.

It is preferred that the heating is effected in heating apparatus by which the heat is first directed to recover end portions of the heat-recoverable article (sleeve) and thereafter is directed to recover portions of the heat-recoverable article (sleeve) between the recovered end portions.

An especially useful form of apparatus for performing the heating step, substantially without relative movement during the heating between the heating apparatus and the heat-recoverable article (sleeve) and other objects to be heated, comprises (a) a housing adapted for positioning around the objects to be heated, incorporating at least first and second channels arranged for alignment with the end portions of the said heat-recoverable article (sleeve) in use and at least a third channel arranged for alignment in use with the said portions of the heat-recoverable article (sleeve) between its end portions, and (b) means for directing heated air through the said at least first and second channels at such a temperature and for such time as will recover the said end portions, and (c) means for (preferably thereafter) directing heated air through the said at least third channel at such a temperature and for such time as will recover the said portions between the ends and substantially completely melt the adhesive to flow and thereafter to cure.

Preferably, the channels are formed in two (or more) housing sections which can be separated to permit lateral insertion of the cable or wire bundle and blocking components and can then be brought towards each other substantially to surround the objects so inserted with the channels aligned as aforesaid with the heat-recoverable article. It is preferred to have a source of hot gas (preferably air) and means for directing hot gas therefrom selectively first into the end-heating channels and then into the central channel (s). It is also preferred to have a separate source of cold gas (air) with means for directing it into the outer channels to cool the ends of the blocking assembly after completion of the heating and shrinking of the ends, while still heating the central portion. The cooled ends thus help to prevent the molten central blocking material from leaking away along the cable while it is flowing and penetrating the interstices of the cable to be blocked. This also has the advantages of reducing the tendency for the sleeve to "milk off" during heating and of reducing the likelihood of thermal damage to the wires near the ends of the sleeve. In a form of apparatus where the channels are provided in two roughly semi-circular separable housing sections, it may be advantageous to provide each of the two sections separately with a hot and a cold gas (air) source and means for directing the gases as aforesaid. A preferred form of the apparatus may include any or all of the following features: automatic means for gripping the cable or wire bundle; automatic means for bringing the housing sections together around the cable or wire bundle and blocking components; automatic means for activating the hot and cold gas (air) supplies (e.g. electrically heated hot air guns); automatic valves or baffles and/or timers for directing the gases into the appropriate channels for the appropriate times.

Figure 10:
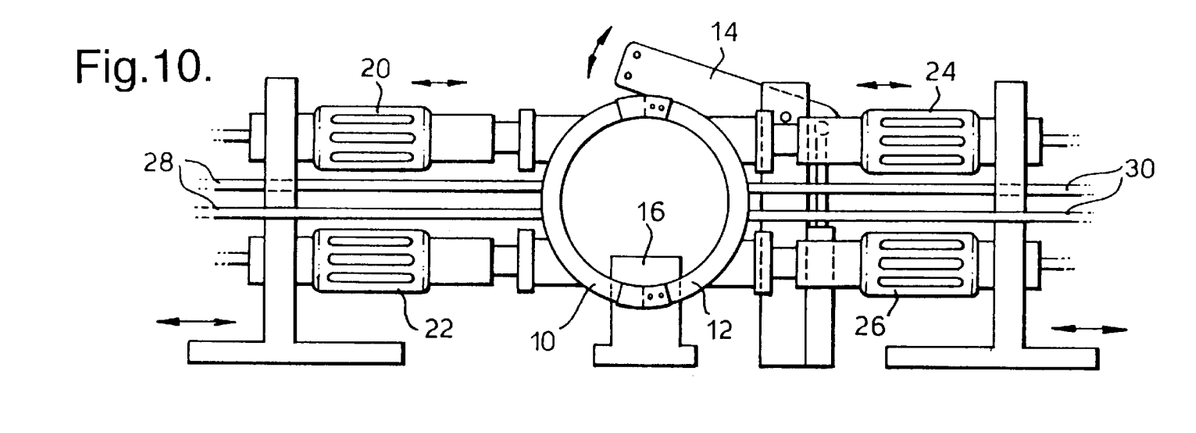
FIGS. 10 to 11 show housings for forming the cable bundles.
Figure 11:
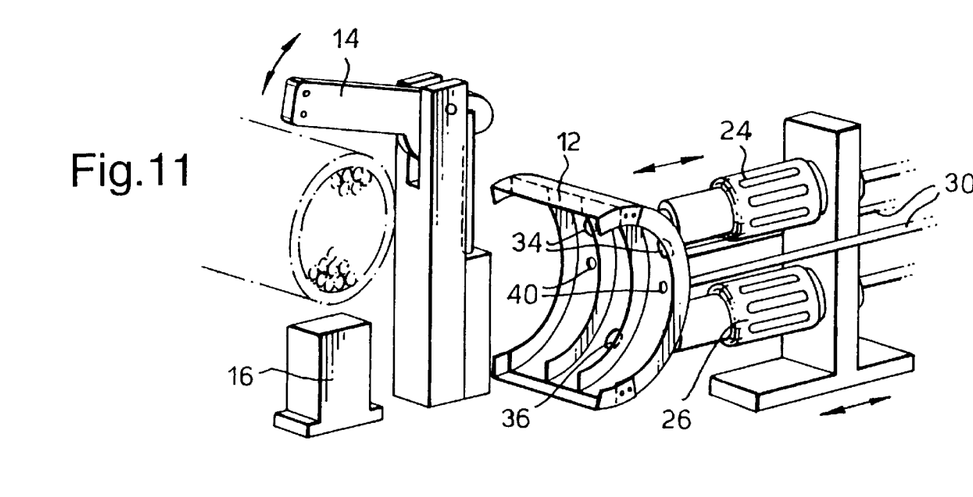

One form of such apparatus is shown schematically by way of example in FIGS. 10 and 11 of the accompanying drawings, wherein FIG. 10 shows the two housing sections in closed position as they would be around a cable or wire bundle (omitted for clarity); and FIG. 11 shows one of the housing sections in the retracted position, displaying the aforementioned three channels for directing the hot gas.

In FIG. 10, the two housing sections 10, 12 are positioned together to surround a cable and blocking components (omitted for clarity) which would in use be clamped by clamping means 14, 16 and would project through the encircling housing sections and out of the plane of the page.

Hot air guns 20, 22, 24 and 26 are connected to inlet holes in the housing sections, guns 20 and 22 being movable together with housing section 10 and guns 24 and 26 being movable together with housing section 12 in the directions indicated by the arrows to separate the housing sections for convenient lateral insertion of the cable and blocking components. The guns are controlled by automatic means (not shown) to apply the necessary heat for the necessary time first to the two outer channels formed within the housing sections and then to the inner channel, as described below. Cold air lines 28, 30 are connected to inlet holes in the housing sections to supply cooling air, again under automatic control, to cool the blocked cable after completion of the heating operations.

FIG. 11 shows the housing section 12 in more detail. Hot air guns 24 and 26 are connected to inlets 34 and 36 respectively in the outer and central channels. The hot air guns 20 and 22 in the other housing section 10 are respectively connected to similar inlets in the outer and central channels, so that a larger supply of hot air, from guns 22 and 26, is provided to the central channel, where enough heat must be supplied for shrinking the central portion of the heat-recoverable sleeve and for melting the bulk of the curable adhesive system inside the sleeve. The cold air lines 30 are correspondingly connected to inlets 40 in the outer channels of housing section 12, while the cold air lines 28 are similarly connected to the outer channels of housing section 10, thus providing a cooling supply to the outer channels only, as aforementioned. Suitable baffles (not shown) may be used to adjust the air flow to encourage uniform circulation.

This, or similar, apparatus may be used advantageously for blocking automotive cables and harnesses, preferably with the layered Part A/Part B adhesive system of the present invention, where efficient repetitive blocking processes are required using external heating.

What is claimed is:

1. A two-part curable adhesive system for blocking interstices or voids within a cable or harness, the adhesive system comprising Part A material and Part B material, wherein Part A and Part B respectively are in the form of sheet or tape, the adhesive system comprising at least one sheet or tape of Part A in face-to-face contact with at least one sheet or tape of Part B, both of which Parts A and B comprise polymeric material and are substantially solid or substantially non-flowable at temperatures up to 60° C. and are substantially unreactive in contact with each other at temperatures up to 40° C., and which Parts A and B are capable of flowing and reacting together when heated in contact with each other to temperatures above 80° C., the materials of Part A and Part B being selected and proportioned so that each of the Parts A and B individually has a Brookfield viscosity less than 200 Pa.s at 80° C., wherein Part A includes material of at least a first type, and Part B includes at least one material selected from the group consisting of materials of said first type and materials of a second type, and wherein said material of Part A of said first type carries reactive groups of at least a first kind, and a said material of Part B carries reactive groups of at least a second kind capable of reacting with said reactive groups contained in Part A when Parts A and B are heated together as aforesaid, Part B being substantially free from reactive groups of the kind or kinds contained in Part A, and wherein the proportion of the said reactive groups in Part A or in Part B respectively
(a) is at least $45\times10^{-5}$ moles of the said reactive groups per gram of total material present in the relevant Part, and
(b) is less than $200\times10^{-5}$ moles of the said reactive groups per gram of total material present in the relevant Part, and wherein the reactivity and proportions of the said reactive groups in Part A and Part B are selected so that, when the Parts are heated to flow and react together, the Brookfield viscosity of the resulting reacting mixture of Part A and Part B
(a) remains below 300 Pa.s
 (i) for at least 3 minutes at 80° C.,
 (ii) for at least 2 minutes at 100° C., and
 (iii) for at least 1 minutes at 150° C., and
(b) rises to at least 1000 Pa.s
 (i) within 20 minutes at 80° C.,
 (ii) within 6 minutes at 100° C., and
 (iii) within 3.5 minutes at 150° C.

2. An adhesive system according to claim 1, wherein the materials of Part A and Part B are selected and proportioned so that the viscosity of either Part is not more than 2 times that of the other part at the same temperature within the range from 80 to 150° C.

3. An adhesive system according to claim 1, wherein the said first type of material is a polymer which is polyamide.

4. An adhesive system according to claim 3, wherein Part A comprises at least 50% by weight of a first amine-terminated polyamide having an amine value less than 60.

5. An adhesive system according to claim 4, wherein Part A includes at least 5% by weight of a second amine-terminated polyamide having an amine value greater than 100.

6. An adhesive system according to claim 5, wherein the said first polyamide has an amine value of less than 20 and greater than 5.

7. An adhesive system according to claim 4, wherein the said first polyamide has an amine value within the range from 20 to 50.

8. An adhesive system according to claim 1, wherein Part B comprises at least 50% by weight of a third polyamide having an amine value not greater than 3 which is an acid-terminated polyamide.

9. An adhesive system according to claim 1, wherein Part B includes the said second type of material which is polymeric, and which carries a majority of the said reactive groups in Part B.

10. An adhesive system according to claim 1, wherein the reactive groups in Part B are acrylate, anhydride or epoxy groups.

11. An adhesive system according to claim 1, wherein a majority by weight of the polymer of Part A and/or Part B is not flowable at temperatures below 80° C., and at least 5% of the polymeric material in Part A and/or in Part B is flowable at temperatures of not more than 40° C., and the proportion of the said flowable polymeric material is selected to reduce the flow temperature of part A and/or Part B to less than 90° C., while maintaining the flow temperature (s) above 60° C.

12. An adhesive system according to claim 11, wherein the flowable (at not more than 40° C.) polymeric material in Part A and/or Part B carries a majority of the said reactive groups in the relevant Part.

13. An adhesive system according to claim 1, wherein a majority by weight of the polymeric material in Part A and/or in Part B is composed of polymer(s) carrying at least $10 \times 10^{-5}$ and fewer than $60 \times 10^{-5}$ moles of the said reactive groups per gram of the said majority polymer(s).

14. An adhesive system according to claim 1, wherein the polymers are selected and proportioned so that each of the Parts A and B individually has a Brookfield viscosity of less than 50 Pa.s at 100° C. and less than 20 Pa.s at 120° C.

15. An adhesive system according to claim 1, wherein a majority by weight of the polymeric material in Part A and/or in Part B has a flow temperature within the range from 70 to 80° C.

16. An adhesive system according to claim 1, carried on a surface of a dimensionally heat-recoverable article such that in use the adhesive system can be arranged between the heat-recoverable article and an object about which the article is to be recovered in use, and the adhesive system will be caused to flow and to undergo reaction between Part A and Part B by temperatures to which the adhesive system is subjected during the heat recovery of the article.

* * * * *